UNITED STATES PATENT OFFICE.

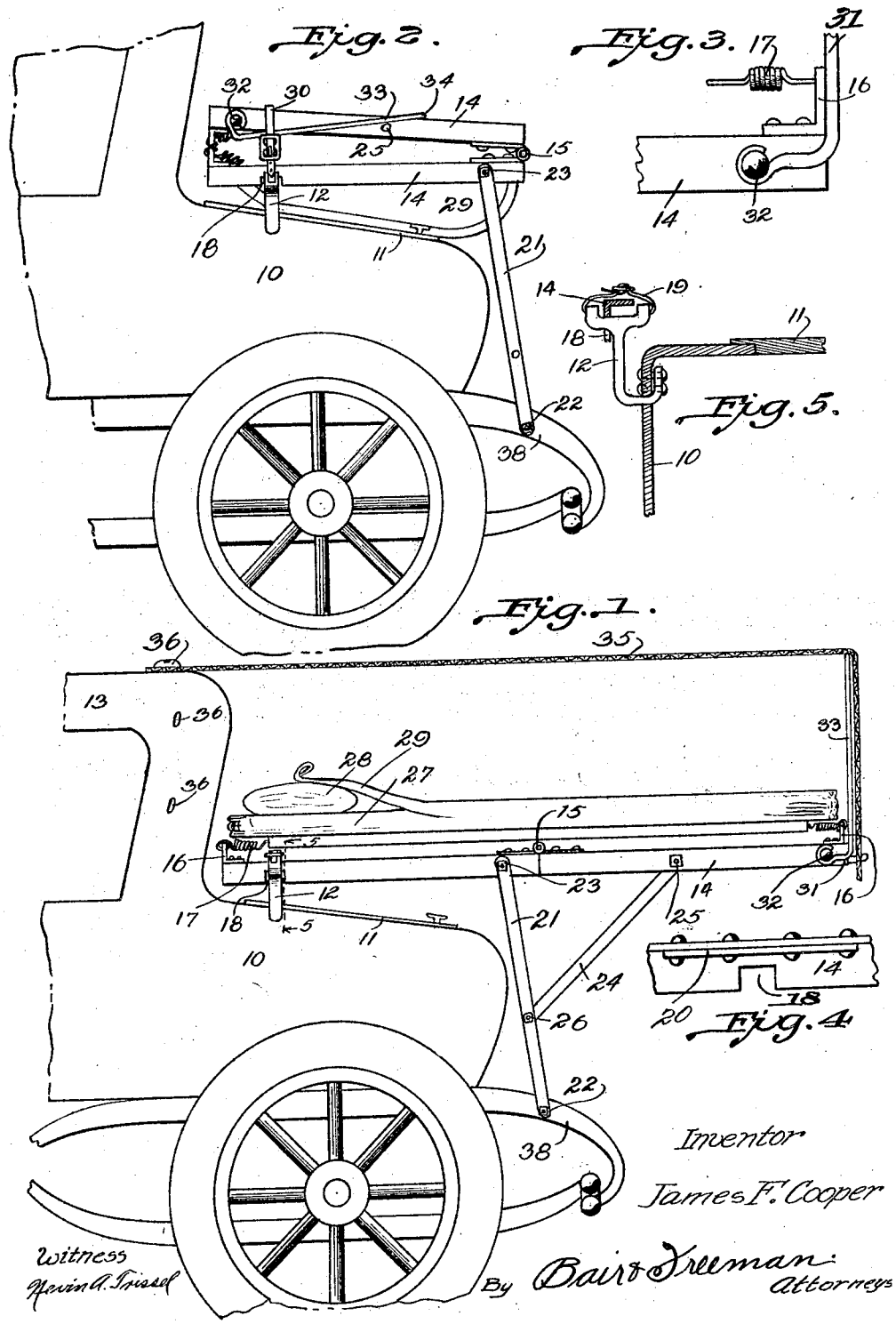

JAMES F. COOPER, OF HANNIBAL, MISSOURI.

COLLAPSIBLE BED AND TENT FOR AUTOMOBILES.

1,413,098.  Specification of Letters Patent.  Patented Apr. 18, 1922.

Original application filed July 30, 1921, Serial No. 488,533. Divided and this application filed January 23, 1922. Serial No. 531,102.

*To all whom it may concern:*

Be it known that I, JAMES F. COOPER, a citizen of the United States, residing at Hannibal, in the county of Marion and State of Missouri, have invented a certain new and useful Collapsible Bed and Tent for Automobiles, of which the following is a specification.

The object of my invention is to provide an automobile bed of simple, durable and comparatively inexpensive construction.

This application is a division of my application, Serial Number 488,533, filed July 30, 1921, which application matured into Letters Patent, No. 1,404,930, dated January 31, 1921.

More particularly, my invention relates to a collapsible bed adapted to be secured to automobiles, which bed may be folded for occupying a minimum amount of space when not in use.

Still another object is to provide an automobile bed, especially adapted to be fastened to a roadster type of automobile.

Still another object is to provide a bed frame hingedly connected together and arranged to be supported on the automobile directly behind the seat thereof.

Still another object is to provide a bed frame secured to the automobile, and a swinging tent frame secured to the bed frame and arranged to be moved to position where a canvas covering may be secured thereto and fastened to the automobile, for forming a complete covering for the bed.

Still another object is to provide a covering member or tent for the bed which may be readily and easily placed in position over the bed.

Still another object is to provide a bed which may be folded together with all of the contents therein so that when the bed is unfolded it is ready for use.

With these and other objects in view my invention consists in the construction, arrangement and combination of the various parts of my device, whereby the objects contemplated are attained, as hereinafter more fully set forth, pointed out in my claim, and illustrated in the accompanying drawings, in which:

Figure 1 is a side elevation of my improved auto bed and tent therefor, placed in operative position on the automobile.

Figure 2 is a side elevation of the same with the bed collapsed and in inoperative position.

Figure 3 is a detail view of a portion of the tent frame for the bed, and,

Figure 4 is a detail view of a portion of the bed frame.

Figure 5 is a sectional view taken on the line 5—5 of Figure 1, showing one of the supports for the bed frame.

In the accompanying drawings I have used the reference numeral 10 to indicate generally an automobile of the roadster type which is provided with a hinged door member 11 whereby access may be had into the back compartment of the roadster automobile when desired.

Secured to the automobile 10 is a bracket member 12 which is ordinarily designed to receive the frame members of the automobile top 13 when they are in their laid-down position.

My improved bed includes a pair of spaced angle irons 14. The angle irons 14 are cut at their center and are secured together by means of a hinge member 15. The free ends of the angle irons are connected together by angle irons 16 which hold the free ends of the angle irons 14 together.

The angle irons 14 and 16 form what I call the bed frame.

Secured to the angle irons 16 is an ordinary bed spring 17 which is preferably formed of coil springs and wire bands of the ordinary construction.

The forward ends of the angle irons 14 are provided with a notch 18, which notch 18 receives a part of the brackets 12. The forward end of the bed frame is thereby secured to the automobile 10.

A strap 19 is extended around the bracket and around the forward ends of the bed frame for securely holding the bed frame in position.

In order to reinforce the angle irons 14 adjacent to the notch 18 I provide a strip of material 20 which is riveted to the angle irons 14 as clearly shown in Figure 4 of the drawings.

In order to support the bed in position, I provide brace members 21 which have their lower ends bolted to the automobile frame by means of the bolts 22 and their upper ends secured to the forward half of the angle irons 14 by means of the bolts 23.

From the construction of the parts just described it will be seen that the brackets 12 and the braces 21 securely hold the bed frame forward of the hinges 15 in proper position.

In order to securely hold the rear half of the bed frame in position, I provide the short braces 24 which are pivotally secured to the rear half of the angle irons 14 by means of the bolts 25.

The lower ends of the braces 24 are secured to the brace 21 by means of the bolt 26 as clearly shown in Figure 1 of the drawings.

A mattress 27 is shown on the bed springs 17; a pillow 28 and blankets 29 are also provided for completing the bed.

When the bed is in the position shown in Figure 1 of the drawings, it will be seen that the rear half of the bed frame does not support as much weight as the forward half of the bed frame, due to the fact that the occupants of the bed sleep with their heads towards the back of the automobile.

When the bed is not desired the bolt 26 is released, which permits the brace 24 to swing to position substantially parallel with the rear half of the angle irons 14. The entire bed contents and rear half of the bed frame may then be swung to position as clearly shown in Figure 2 of the drawings. A strap 30 may be extended around the angle irons of the bed frame for holding them in their inoperative position.

In order to form a canopy or tent for the bed frame, I provided a rod 31 which is pivoted to the rear end of the angle irons 14 at 32. The rod 31 is substantially U-shaped so as to provide a pair of upwardly extending arms 33 and a cross piece 34 for connecting the upper ends of the arms 33.

The rod member 31 is so arranged that when it is in its raised position it will rest against the rear angle iron 16.

A canvas covering 35 is extended from the top 13 of the automobile over the rod 31. The automobile top may be provided with fastening devices 36 whereby the top and sides of the canvas covering 35 may be secured at its forward end.

The canvas covering when secured to the fastening devices 36 will hold the rod 31 in its raised position.

The canvas covering 35 is provided with a top and a pair of sides as well as one end so as to form a complete covering for the bed.

When it is desired to fold the bed up the canvas covering 35 is removed and placed on the blankets of the bed; the rod 31 is folded to position shown in Figure 2 of the drawings. The brace 24 is detached from the brace 21 whereby the entire rear half of the bed and the frame therefore may be folded upon the other, as clearly shown in Figure 2 of the drawings.

It will be seen that I have provided an automobile bed of simple construction, and which can readily and easily be opened or closed, as desired.

Some changes may be made in the construction and arrangement of the parts of my device without departing from the real spirit and purpose of my invention, and it is my intention to cover by my claim, any modified forms of structure or use of mechanical equivalents, which may be reasonably included within its scope.

I claim as my invention:

1. In a device adapted to be used in combination with an automobile, a collapsible bed including a two-part frame hingedly connected together, each part of said frame having one side open and having their open sides adjacent to each other, one part of said frame being rigidly secured to the automobile, a bed spring having its ends fixed to the opposite ends of said two-part frame, a brace member secured to one part of said frame at one end and to the automobile at the other end, a second brace member secured to the other part of said frame at one end and to said first brace at the other end thereof, whereby the entire two-part frame may be permitted to remain in a horizontal plane for forming the bed as specified.

2. In a device adapted to be used in combination with an automobile, a collapsible bed including a two part frame hingedly connected together, each part of said frame having one side open and having their open sides adjacent to each other, one part of said frame being rigidly secured to the automobile, a bed spring having its ends fixed to the opposite ends of said two-part frame, a brace member secured to one part of said frame at one end and to the automobile at the other end, a second brace member secured to the other part of said frame at one end and to said first brace at the other end thereof, the parts being so arranged that the entire frame may be supported in a horizontal plane for use as a bed or may be swung one upon another when no bed is desired.

Des Moines, Iowa, December 28, 1921.

JAMES F. COOPER.